United States Patent [19]
Kühling et al.

[11] Patent Number: 5,081,916
[45] Date of Patent: Jan. 21, 1992

[54] SUPPORT ELEMENT, CLAMP ELEMENT AND STOP ELEMENT FOR THE PREPARATION AND/OR IMPLEMENTATION OF A COOKING PROCESS OF PIECES OF MEAT, ESPECIALLY POULTRY

[76] Inventors: Franz Kühling, Apfelweg 6, D-2842 Lohne; Rolf Grimm, Berberitzenweg 6, D-2903 Bad Zwischenahn; Gottfried Riesselmann, Achtern Diek 34, D-2848 Vechta, all of Fed. Rep. of Germany

[21] Appl. No.: 423,465

[22] PCT Filed: Jan. 21, 1988

[86] PCT No.: PCT/EP88/00038
 § 371 Date: Sep. 25, 1989
 § 102(e) Date: Sep. 25, 1989

[87] PCT Pub. No.: WO88/05278
 PCT Pub. Date: Jul. 28, 1988

[30] Foreign Application Priority Data

Jan. 24, 1987 [DE] Fed. Rep. of Germany ....... 3702090
Jan. 24, 1987 [DE] Fed. Rep. of Germany ....... 3702091
Jan. 24, 1987 [DE] Fed. Rep. of Germany ... 870116[U]
May 26, 1987 [DE] Fed. Rep. of Germany ....... 3717671
Dec. 23, 1987 [DE] Fed. Rep. of Germany ....... 3743787

[51] Int. Cl.⁵ .............................................. A47J 43/18
[52] U.S. Cl. ......................................... 99/419; 99/345; 99/426
[58] Field of Search ................. 99/419, 415, 426, 425, 99/449, 448, 418, 444, 446; 211/181, 189, 125, 195; 248/174

[56] References Cited

U.S. PATENT DOCUMENTS

| | | | |
|---|---|---|---|
| 1,485,253 | 2/1924 | Devlin | 99/419 |
| 2,790,585 | 4/1957 | Smith | 99/419 |
| 2,821,904 | 2/1958 | Arcabosso | 99/346 |
| 3,392,665 | 7/1968 | Harnest | 99/426 |
| 4,027,583 | 6/1977 | Spanek et al. | 99/345 |
| 4,127,060 | 11/1978 | Curtis | 99/419 |
| 4,450,759 | 5/1984 | Steibel | 99/426 |
| 4,557,188 | 12/1985 | Spanek | 211/181 |
| 4,633,773 | 1/1987 | Jay | 99/446 |
| 4,709,626 | 12/1987 | Hamlyn | 99/345 |
| 4,738,192 | 4/1988 | Odom, Jr. | 99/419 |

Primary Examiner—Timothy F. Simone
Attorney, Agent, or Firm—Watson, Cole, Grindle & Watson

[57] ABSTRACT

A support element for supporting fowl during storage and for use during cooking possesses an overall conical shape and comprises a first generally cylindrical section, a second conical tapered section and a third generally cylindrical section. The first section has a larger diameter than the third section. The first section merges into the second section to define a shoulder on which the fowl can rest by virtue of its bone structure.

6 Claims, 14 Drawing Sheets

SUPPORT ELEMENT, CLAMP ELEMENT AND STOP ELEMENT FOR THE PREPARATION AND/OR IMPLEMENTATION OF A COOKING PROCESS OF PIECES OF MEAT, ESPECIALLY POULTRY

BACKGROUND OF THE INVENTION

The invention relates to a support element for insertion into the passage cavities of pieces of meat.

DESCRIPTION OF THE RELATED ART

Such a support element is known, for example, from U.S. Pat. No. 4,027,583. The known support element comprises two telescoping wire rack parts which can be slid into one another, the wires of the bottom part being in the shape of a section of a hyperbolic curve. A bird, for example, a chicken, is inserted on the bottom support element from the top through its bottom opening. Then the second support element is pushed from the top, through the neck region of the chicken. The chicken is held due to the support elements fitting together like a telescope.

The known support element is not satisfactory in many aspects for example, the two part design has been found unsatisfactory. And, when inserting the upper support element by hand or by means of a special tool, a suitable opening must first be made in the bird which appreciably increases the cost in handling.

SUMMARY OF THE INVENTION

The object of the invention is to provide a support element which avoids the drawbacks of the prior art, and which is of a simpler design.

In accordance with the invention, the support element has a point section of decreased diameter to enable the element to push through, fill out and/or maintain the passage cavity in a piece of meat or frozen piece of meat, especially frozen poultry.

Thus, the support element can be pushed into the passage cavity of the meat until the point end of the support projects at the top above the piece of meat or poultry. No other part need be inserted into the piece of meat. Moreover, the point-section of reduced diameter is adaptable to the bone structure of poultry, especially a chicken. For example, there is a shoulder on which the bird can be supported due to its bone structure. Another special advantage of the support element of the invention is that a piece of meat, especially poultry, can be frozen together with the support element.

Preferably support elements of different designs are provided for remaining in the piece of meat during frozen storage and for use during the cooking process. The support element, when being retained during the freezing process, is preferably designed as a closed wall cavity. Since such a designed support element is not suitable for carrying out the cooking process, it must be removed prior to the start of the cooking process and replaced by another support element, designed in a manner to be described below. The design of a closed wall cavity has the advantage that it is relatively simple to remove even when the piece of meat is frozen.

A support element, as used preferably for carrying out the cooking process, has an opening at the bottom end and supports that are spaced from one another and that form an air passage opening into the point-section. Thus, similar to the known support element as mentioned above, it is obvious that it is possible to provide a passage for hot air through the inside of grilled food. It is also especially important that the support element be designed as conical as possible. Thus, when the support element is retained in the piece of meat during frozen storage, its conicity permits removal from the frozen piece of meat. The conical design, however, is also important for the support element used during the cooking process. By having a conical design the support element has a diameter which becomes gradually smaller from the bottom to the top, aside from the transition to the point-section of decreased diameter, such that the support has a transitional step between its conical end and its point section.

Another feature of the support element is that the supports thereof are capable of expansion. In particular, this feature can be designed as an alternative to the step design. When applying and subsequently carrying out the cooking process with a frozen piece of meat, for example a frozen bird, the piece of meat thaws first. The expandable support elements avoid problems during bird mounting and can be designed, for example, in the shape of a spring.

The aforementioned support elements adapted to be retained in the piece of meat during frozen storage, and for use during a cooking process, are preferably adapted to one another in such a manner that an element, intended to remain in the piece of meat during frozen storage, has at least in its bottom region outer dimensions that match the intended dimensions of an element to be used during a cooking process. Also the elements may be designed almost identical in their outer shape, although the element to remain in the piece of meat during frozen storage has slightly larger dimensions.

The details of the support element will now be described. As stated above, the support element is preferably designed as a conical spreading body so that it can be driven wedge-shaped into the meat, the support element tapering off conically, preferably in steps, into several sections, and the diameters of the individual sections being adapted to the natural expansion of the inner cavity of the meat. In another development of the invention, the support element used as the spreading member, is designed largely as a rod-shaped body, for which the spreading elements project radially. The spreading elements hold the wall of a slaughter opening, such as a bird, away from the rod-shaped body to enable the entry and passage of air. Preferably the spreading elements can be moved in the radial direction to facilitate the introduction of the spreading body into the meat. The rod-shaped body can, for example, be designed hollow so that it is possible to partially lower the spreading elements into the rod-shaped body. In accordance with another embodiment of the invention, the support element has at one end a connecting element by means of which, it can be attached as a grill spit, for example, horizontally into a grilling device. In a preferred embodiment the piece of meat is prevented from sliding off the horizontally mounted support element in that the free end opposing the connecting element has a detachable stop element that extends transversely relative to the support element. The support element can also be designed as a casing of a heat source so that the meat can be heated via the heat source actively from the inside through the support element.

A very important advantage of the described support elements, especially of different support elements for remaining in a piece of meat during a freezing process, and use during a cooking process, is that it is no longer necessary to completely thaw or partially thaw pieces of meat, especially poultry, prior to carrying out a cooking process. Such complete thawing or partial thawing is dubious from an hygienic stand point for a kitchen operation because the thawed carcasses can release bacteria, germs and the like, which can be transferred by means of tools that come into contact with the carcasses and persons in a kitchen operation. The invention supports poultry carcasses, which can also be placed in the frozen state on a grill spit or on a support element of the invention.

The aforedescribed support element, designed preferably adopted to remain in the piece of meat during a freezing process, is designed as a round profile, which extends through the carcass, like a rod, after having been inserted into the carcass and projects on the neck side and the abdominal side out of the carcass openings resulting from the slaughter. After freezing, the round profile remains in the carcass and can be pulled out again directly before preparation. The design as a cavity, for example in the shape of a sleeve, has the advantage that it can be wetted, for example, from the inside with water, especially warm water, in order to facilitate the removal from the deep-frozen bird carcass directly before it is inserted into a cooking device. The support element can be designed as a one-sided open cavity in which correspondingly warm water can be introduced to facilitate the removal from the frozen bird carcass. In this process the support element can be designed, e.g., as a cone. The support element is always at least as long as the bird carcass so that the ends project from the frozen bird carcass and a continuous passage cavity is formed after the support element has been pulled out. As aforedescribed in part, the support element can also have sections of different diameters. Thus the support element can have, e.g., a relatively large diameter in order to hold open the abdominal cavity and chest cavity of the bird carcass relatively wide. This enables the carcass to be prepared for cooking, such as inserting fillings or coating the carcass with spices and herbs from the inside. A preferred embodiment provides that the support element has a first cylindrical, conical section that fills the abdominal cavity and merges into a second point-section that tapers off conically and fills the chest cavity and which can even force its way through the neck of the carcass or can terminate in a third, pin-shaped section. If the support element is intended to remain in the piece of meat during a freezing process, it can be made of plastic, which from a food technology standpoint is non-hazardous. However, other suitable materials can also be used. If the support element is intended for conducting the cooking process, it is preferably made of stainless steel.

Another preferred embodiment of the support element, which is intended to remain in the piece of meat during a freezing process, provides for projections that may spread, radially are in pre-determined regions. The radially spreading projections act as barbed elements, which anchor the expanding element inserted into the bird carcass. In this manner unintentional dislodgement is prevented. The projections are preferably designed as moulded-on straps. The straps can be uniformly distributed on the periphery of the expanding element. For example, four straps can spread radially in one plane. In such a support element, first projections are arranged in the region of the free end of the point-section, also possibly the third pin-shaped section. Preferably the first projections are straps, which are located at the point and connected to the point-section via a joint element. The joint element facilitates bending of the straps while pushing the plug-like support element into the carcass so that the insertion is possible with little energy because the straps can be disposed adjacent the outer peripheral surface of the support element during the inserting. However, if the support element tends to slide out in a direction opposite insertion, the straps can pivot and anchor in the meat of the carcass like barbs. Preferably each joint element is designed as a film hinge. Since the support element may be of plastic, film hinges function as articulated joints for moulded on straps. However, it is also possible to provide as projections at least one annular disk arranged flange-like on the third section or point-section. The annular disks can be made, e.g., of a flexible material so that when the support element is inserted into a carcass, they can wrap themselves around and raise themselves again like barbs. To fasten the annular disks to the support element provision is made that in the third section at least one circular groove is provided to receive one annular disk. Just as straps, arranged star-shaped, can be distributed in several planes, several annular disks can also be stacked. The annular disks can also have different diameters. Furthermore, the support element is characterized in that two projections are arranged on the bottom free end of the cylindrical section. The second projections can be advantageously used as handles to facilitate the removal of a support element out of the frozen meat. Furthermore, the second straps may have a roughened surface to facilitate removal of the support element. Furthermore, the invention includes a clamping element, which in order to clamp grill foods, especially frozen poultry, which has a cavity provided with a support element as aforedescribed, can be slid on a grill spit with arms that project against the grill food and can penetrate preferably into the grill food. A frozen piece of meat, especially poultry, which is subjected directly to a cooking process, in particular by grilling, presents the problem that during the thawing process the meat softens gradually such that any fasteners that were used can increasingly slide off from the grill spit. In accordance with the clamping element has at least one springy element the arms of which are supported by spring tension on the grill food. Thus, as the volume of the grill food diminishes, the arms are held resting on or engaged with the grill food. Provision can be made for arms for the clamp element that enclose the grill food and are designed as springly elements; for example, the arms can be metal tongues or the like so that under inherent spring tension the arms rest on the grill food and, as the grill food decreases in volumes, remain at the grill food owing to its spring tension. The arms can also be designed as spreaders, which reach into a cavity in the grill food and grasp from inside the grill food. Metal tongues or spring fingers are suitable as flexible elastic elements, which hold from inside the grill food and simultaneously spread out a cavity in the grill food. Thus in such a spread out cavity, for example, the cavity of poultry, the heat can also be brought to the grill food to cook the inside, thus shorter cooking times being achievable. In a preferred embodiment of the clamp element of the invention provision is made in that the clamp element has at least a grasping element that bears arms and can move in the longitudinal direction of the grill spit and that the springy element is a pressure spring acting on the grasping element in the longitudinal direction of the grill spit. If the grill food volume reduces when grilling, the distance between two clamp elements between which the shrinking grill food is held also changes due to spring tension of the pressure spring. The advantageous result of such a process is that the grill food continues to remain clamped between the pair of clamp elements with adequate tension; the arms of the clamp elements remain resting against the grill food or are held engaged. If the grill food has been placed on the grill spit in the frozen state, under some circumstances it may have been frozen so solid at the start of the grilling process that even insertable arms could not yet penetrate the grill food. When the grill food thaws, the spring tension of the pressure spring causes the arms to penetrate for the first time into the grill food as it becomes softer. Of course, arms, which are designed as springy elements, e.g. prongs projecting from the grasping element, fingers and the like comprising parts made of elastic material can be combined with such pressure springs. The clamp elements of the invention are supported by means of the spring tension of two springy elements acting upon the grill food, viz. not only by means of the inherent springiness but also due to the pressure spring.

Another embodiment of the invention provides that the clamp element has two grasping elements with arms pointing in opposite directions, a pressure spring being placed between the grasping elements. When the pieces of grill food are placed on the spit, a clamp element of the invention with arms projecting on both sides is placed between the adjacent pieces of grill food, such that the grasping elements of the clamp element are forced together as far as the pressure spring therebetween will permit so that the grasping elements of the clamp elements are loaded with the spring tension of the pressure spring and are forced apart in the direction of the pieces of grill food so as to be held by them when the pieces of grill food shrink.

Another embodiment of the invention provides that the grasping element is braced via the pressure spring against a slider that can be fastened, for example, with a set screw on the grill spit. The clamp elements with individual grasping elements braced via pressure springs and clamp elements with two grasping elements, which are braced against one another via the pressure spring, can be combined with one another on a grill spit, the clamp elements with the individual grasping elements being secured on the grill spit at the ends of the spitted grill food row.

The pressure spring is preferably a spiral spring that can be pushed concentrically on to the grill spit.

Another embodiment of the invention provides that the arms of the clamp element comprise prongs, aligned, for example, parallel to the grill spit. The prongs can be correspondingly shaped or bent of springy wire. They can also be designed as metal points, hook points or the like, as is the case with conventional clamp elements but can penetrate deep into the grill food subject to the spring tension of the springy element so that an especially secure hold of the grill food on the grill spit is guaranteed. Preferably each of the prongs has at least one cutting edge, which cuts into the grill food, in particular still frozen grill food, and thus holds the grill food, especially rotationally stable, on the grill spit.

Another object of the invention is a stop element for use on the grill spit. The advantage is that the stop part has an extension, whose diameter is several times, for example five to fifteen times the diameter of the passage bore of the fastening part, thus the diameter of the grill spit. Even in the case of the aforementioned potential shrinkage and softening of the grill piece during the thawing process, a secure hold is, nevertheless, assumed.

Also, the invention can be described as a process for cooking, preferably grilling, deep-frozen meat, especially poultry such as chicken or the like, the process being characterized in that the deep-frozen bird carcass is provided with a break-through extending through the carcass prior to cooking. Furthermore, an important feature of the process is that the break-through is formed by pulling an expanding element out of the frozen bird carcass, which is stuck through its body cavity before the freshly slaughtered and eviscerated bird body is frozen.

BRIEF DESCRIPTION OF THE DRAWINGS

The invention is explained in detail with reference to the embodiments illustrated in the attached drawings as follows.

FIG. 3 is a top of the stop element of FIG. 22.

DETAILED DESCRIPTION OF THE INVENTION

Figures 1, 2:
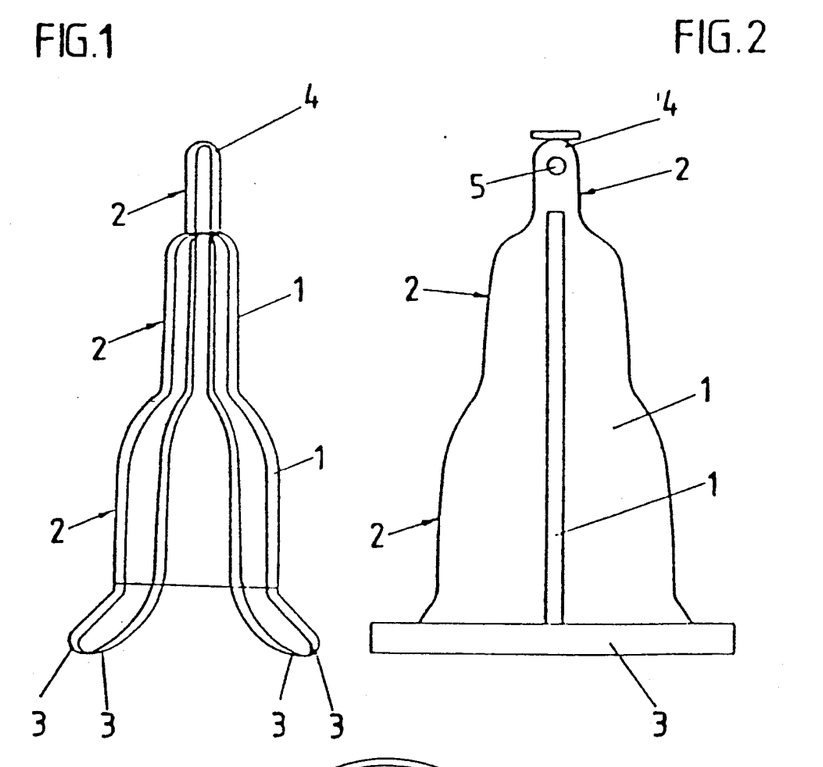
FIG. 1 is a side view of a first embodiment of a support element.
FIG. 2 is a side view of a second embodiment of a support element.

A support element, shown in FIG. 1, is cage-like in its design and comprises supports 1, which may be of wire. The support element tapers off, in steps, into several sections 2, which are also designed conically. The support element is designed as an upstanding with four feet 3. A piece of meat, for example a bird, especially a frozen bird, can be attached in such a manner on the support element that the support element penetrates into a slaughter opening of the meat and the projecting end or the point-section 4 of the support element projects out of the meat at the top.

The supports 2 are spaced apart from one another so that the spaces therebetween permit the hot air to reach the meat. Moreover, the support element can reach with hooks or the like below the projecting end 4 in the point-section and can be lifted together with the attached meat.

Figure 3:
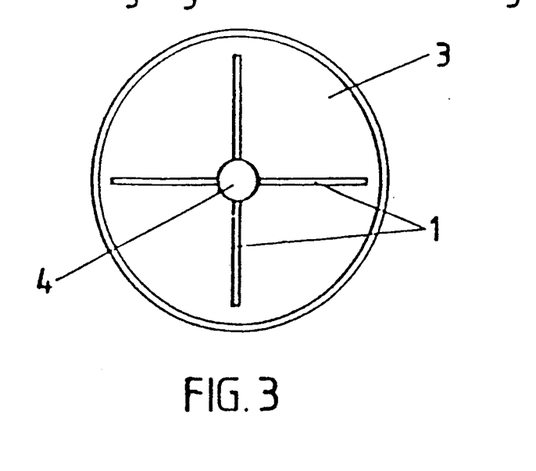
FIG. 3 is a top view of the support element of FIG. 2.

FIG. 2 is a side view of a second embodiment of a support element, which, as the support element of FIG. 1, tapers off gradually into several sections 2, but in a conical fashion. The support element of FIG. 2 comprises two supports 1 designed as strips, the supports 1 being connected to one another in the shape of a cross. In the region of the upper end 4 the support element has an opening 5 for lifting the support element. The support element of FIG. 2 is also designed as a rack, the foot 3 thereof comprising a grease pan further illustrated in FIG. 3.

Figure 4:
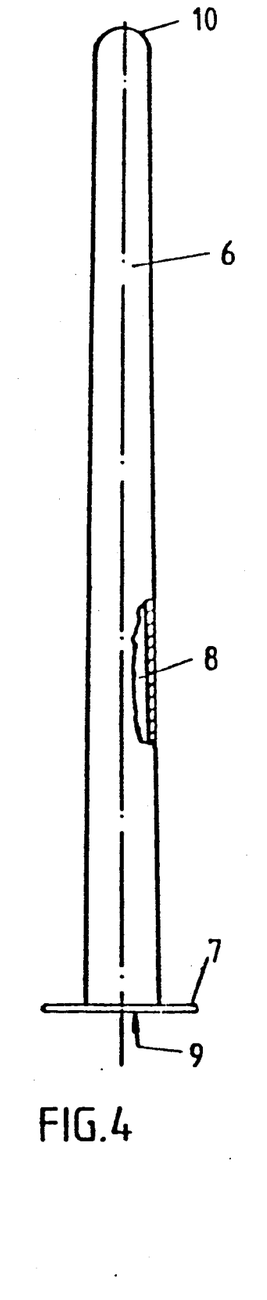
FIG. 4 is a side view of another support element.

The support element of FIG. 4 is designed as an elongated cone having a round cross-section. A collar flange 7, which facilitates the handling during insertion and removal in or out of the bird carcass, which is not illustrated in detail here, is moulded to the bottom end. The broken-away section in FIG. 4 shows clearly that the cone is designed as a hollow part that encloses a cavity 8 which is open at the bottom end at 9 and whose upper end 10 is closed. The support element is rounded off at the closed upper end 10. As illustrated, the shape of the cone 6 is continuously slightly conical, that is, at the bottom end in the region of the collar flange the round diameter is larger than in the region of the upper end 10.

Figure 5:
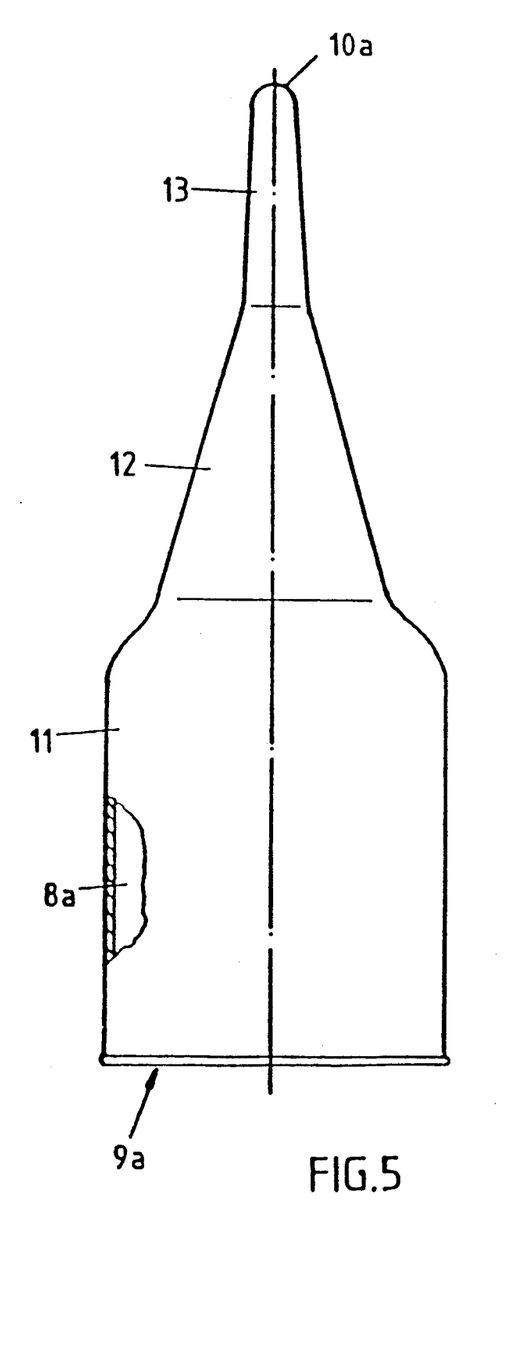
FIG. 5 is a side view of another support element.

FIG. 5 shows another sleeve-like embodiment of a support element. Again the broken-away section shows clearly that the support element is hollow, its walls enclosing a cavity 8a. At the bottom end the support element is open at 9a. The upper end 10a is closed and rounded off. This support element has sections of different diameters, a first cylindrical section 11, filling the abdominal cavity of a bird carcass (not illustrated here). The cylindrical section 11 merges into a second section 12, which tapers off conically and fills the chest cavity of the bird carcass and which terminates in a third pin-shaped section 13 that penetrates the opening in the region of the neck of the carcass and that terminates in the upper end 10a of the expanding element.

Both support elements shown in FIGS. 4 and 5 are moulded of plastic as hollow parts open at the bottom end.

Figure 6:
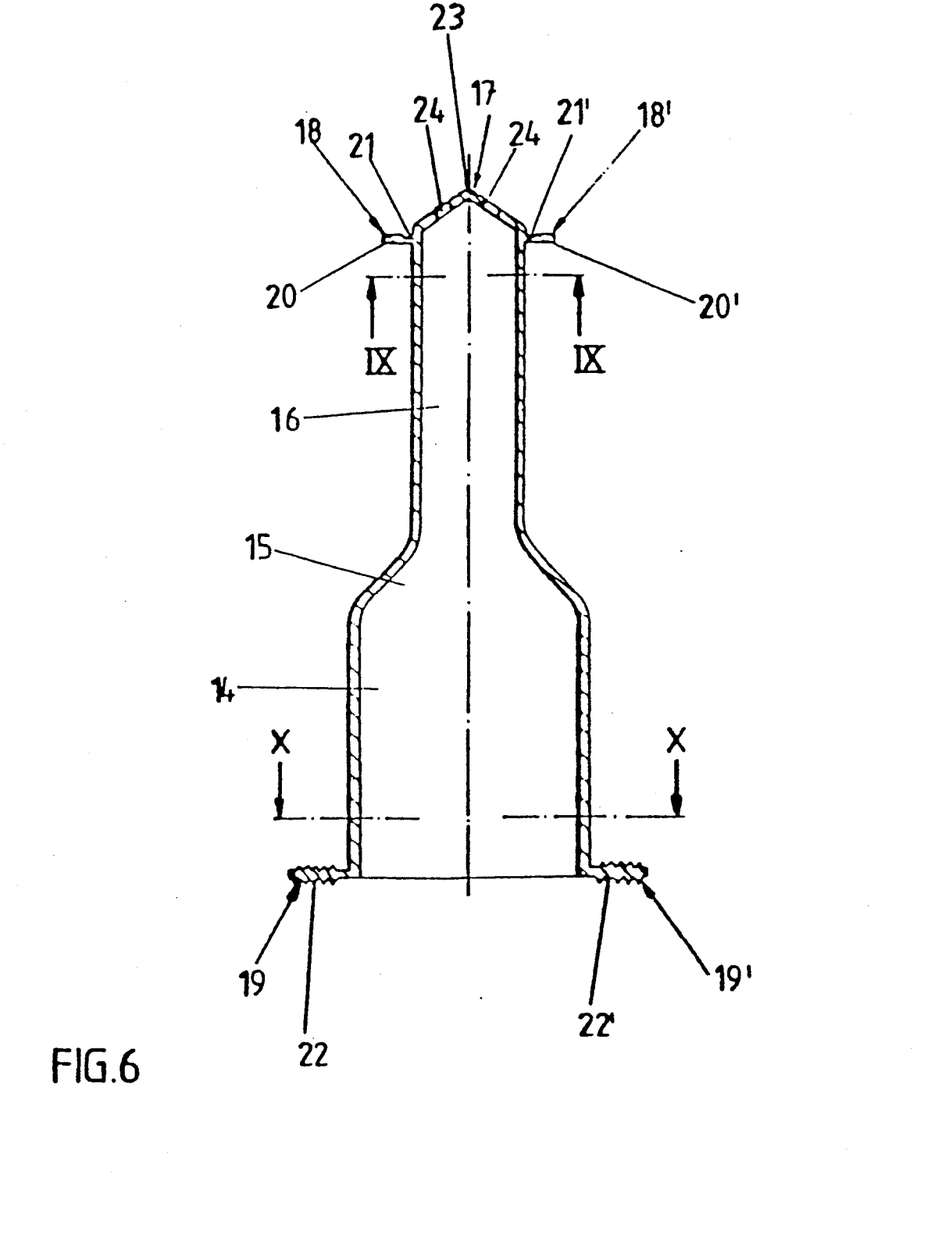
FIG. 6 is a sectional view of a support element with radial projections.

FIG. 6 is a sectional side view of another support element comprising a hollow cone having a bottom first cylindrical section 14, which merges into a second section 15 that tapers off. The tapering second section 15 terminates in a third section 16. In pre-determined regions the support element has projections that extend, for example, radially. First projections 18, 18' are arranged in the region of the free end 17 (point-section) of the third pin-shaped section 16, and second projections 19, 19' are arranged at the bottom free end of the cylindrical first section 14. Each first projection 18, 18' is designed as a moulded-on strap 20, 20', each strap being joined to the third section 16 via a film hinge 21, 21' and second projections 19, 19' are designed as straps 22, 22' having roughened opposing surfaces as shown.

The straps 22, 22' function as grasping elements to enable the expanding element to be easily pulled out of a frozen carcass.

The free end 17 of the third section 16 has a sealing point 23 having through openings 24. Heated water, which can drain through openings 24 into the frozen carcass to accelerate thawing for the purpose of loosening the expanding element out with greater ease, can be filled into the hollow expanding element.

Figure 9:
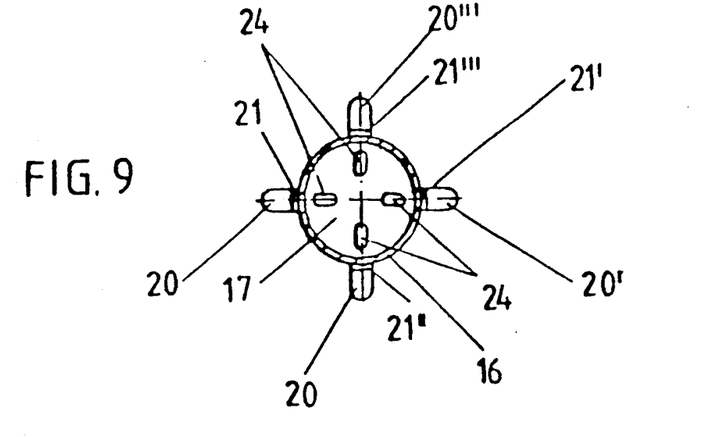
FIG. 9 is a sectional view taken along line IX—IX of FIG. 6.

As shown in FIG. 9, the support element of FIG. 6 has four first projections on straps 20, 20', 20'', 20''' joined to the third section 16 by corresponding film hinges 21, 21', 21'', 21'''.

Figure 10:
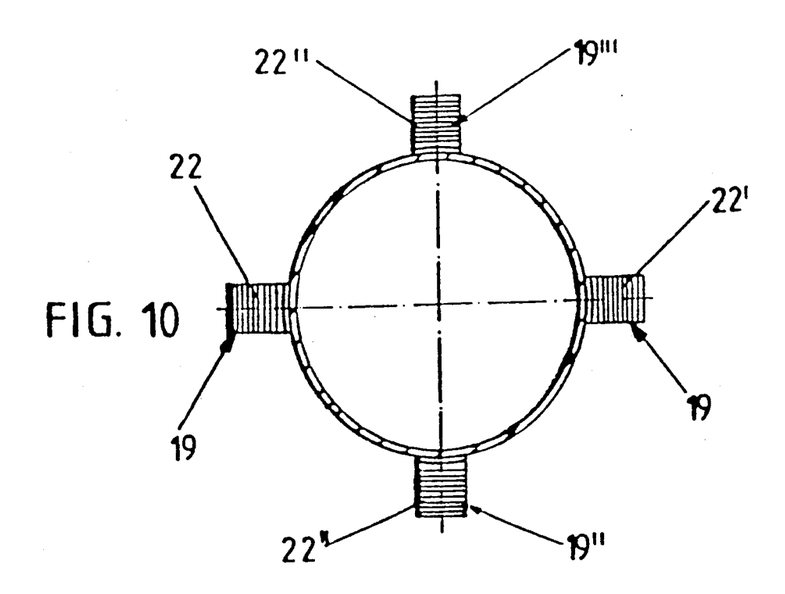
FIG. 10 is a sectional view taken along line X—X of FIG. 6.

As shown in FIG. 10, the support element of FIG. 6 has four second projections 19, 19', 19'', 19''' on straps 22, 22', 22'', 22''' having roughened opposed surfaces.

Figure 7:
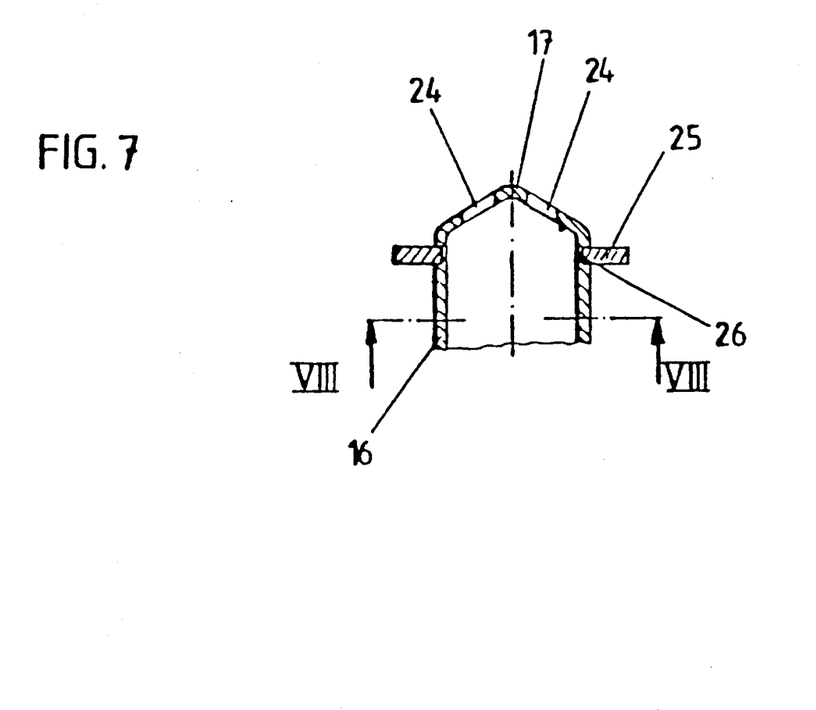
FIG. 7 is a sectional view of a point of a support element with an annular disk.
Figure 8:
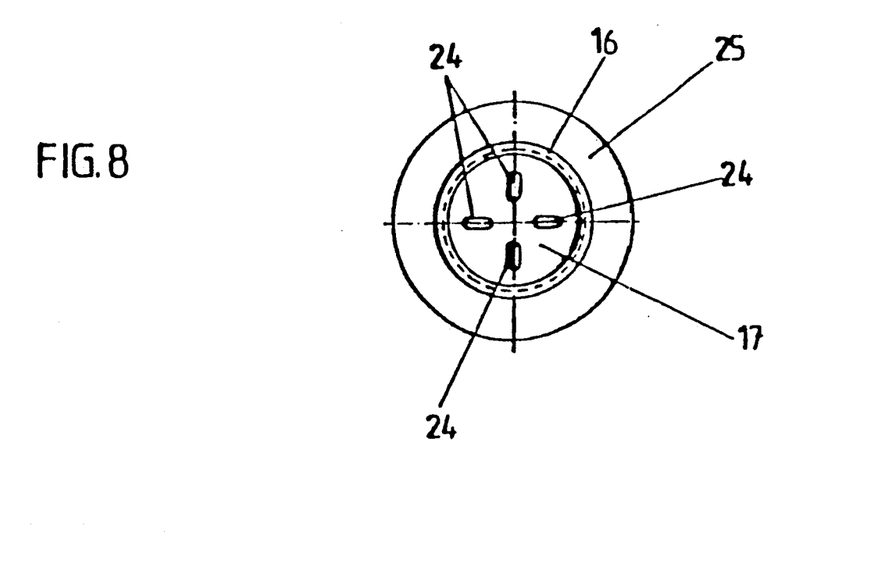
FIG. 8 is a sectional view taken along line VIII—VIII of FIG. 7.

As shown in FIGS. 7 and 8, at least one annular disk 25 projects radially from third section 16 and is made of a flexible material. The third section 16 has at least one circular groove 26 to receive annular disk 25 for mounting it in place.

Figure 11:
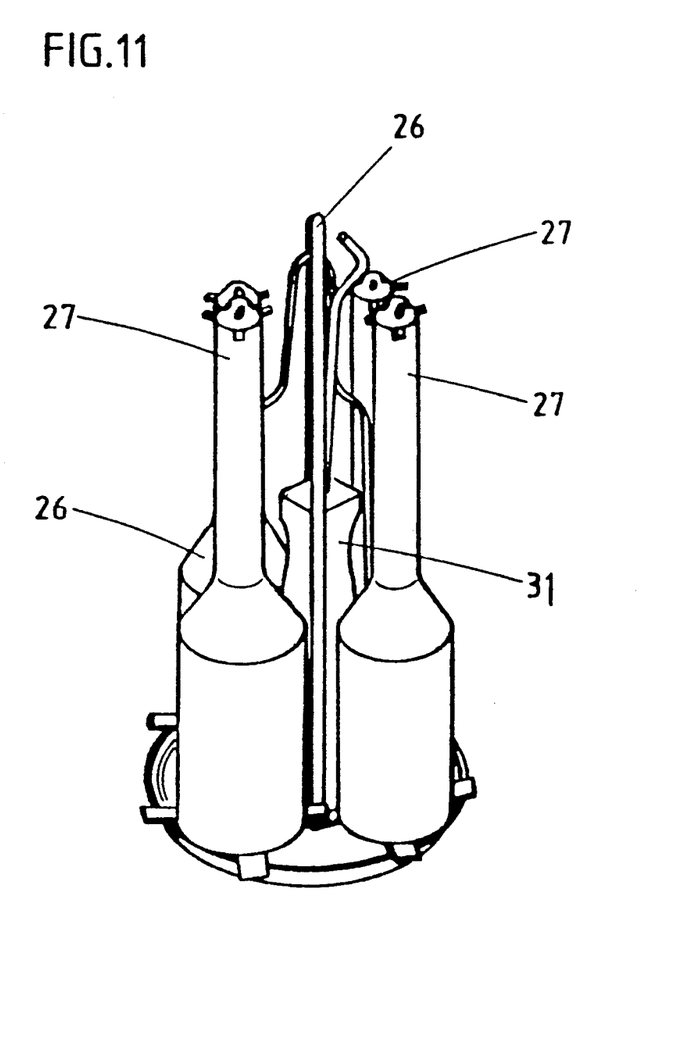
FIG. 11 shows a set of support elements of which one can be used during the cooking process and others can be used during frozen storage.
Figures 12, 13:
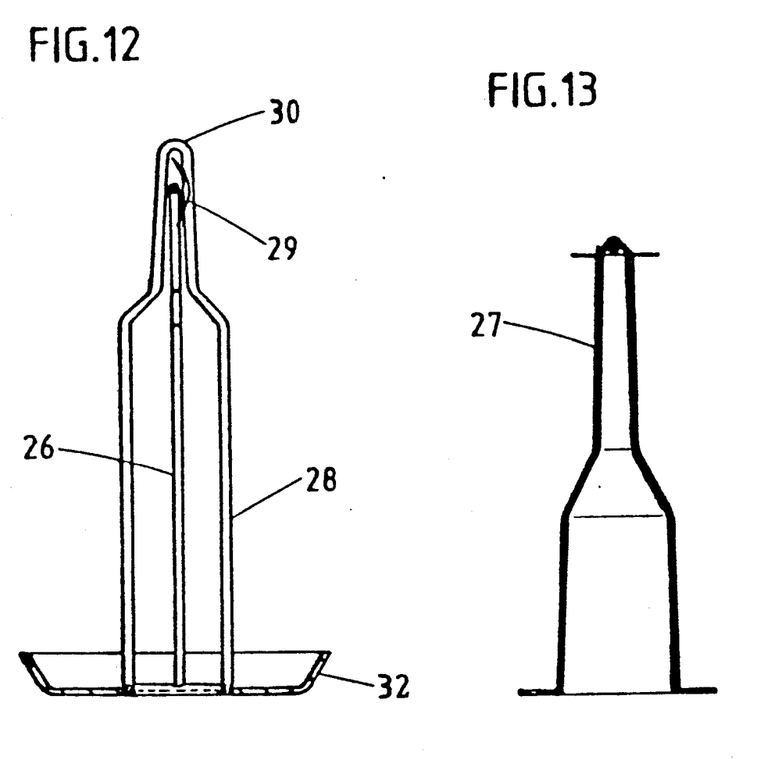
FIG. 12 is a fragmentary sectional view of the support element illustrated in FIG. 11 for use during the cooking process.
FIG. 13 is a sectional view of a support element illustrated in FIG. 11 for use during frozen storage.

FIG. 11 shows a set of support elements, the support element 26 being designed as a support element to be used during the cooking process and the support elements 27 being designed as support elements remaining in a piece of meat during frozen storage. As shown in FIG. 12 support element 26, comprises two wire loops 28 that are arranged cross-shaped relative to one another, a wire loop in the point-section projecting over the other so as to provide a passageway for air corresponding to the arrow 29. One of the longer extending loops 28 has a point 30 to facilitate insertion of the support element into the pieces of meat in particular poultry, so as to be put into a grilling oven. Element 11, FIG. 11, facilitates removal of the support element from the meat.

The support element of FIG. 12 has a bottom catch basin 32 for grease and the like which runs off the meat.

The support element shown of FIG. 13 is essentially the same as that of FIG. 6 except that it is continuously conical.

Figure 14:
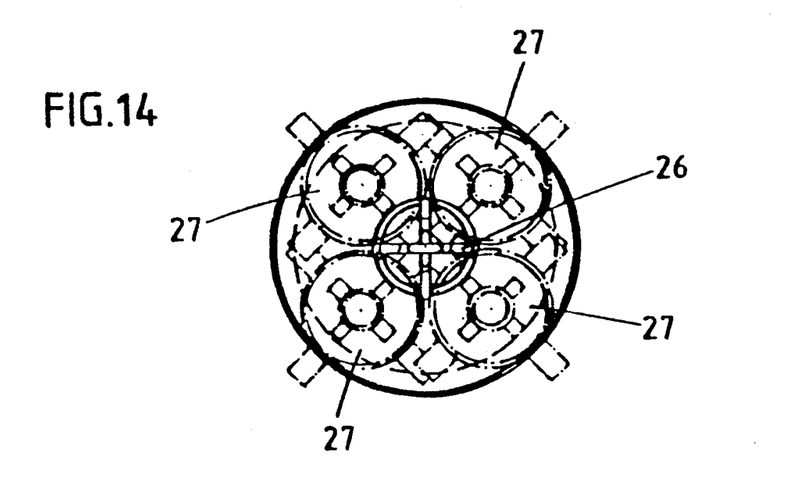
FIG. 14 is a top view of the set of support elements of FIG. 11.

As shown in FIG. 14 the support elements can be arranged together to form a sale set.

Figure 15:
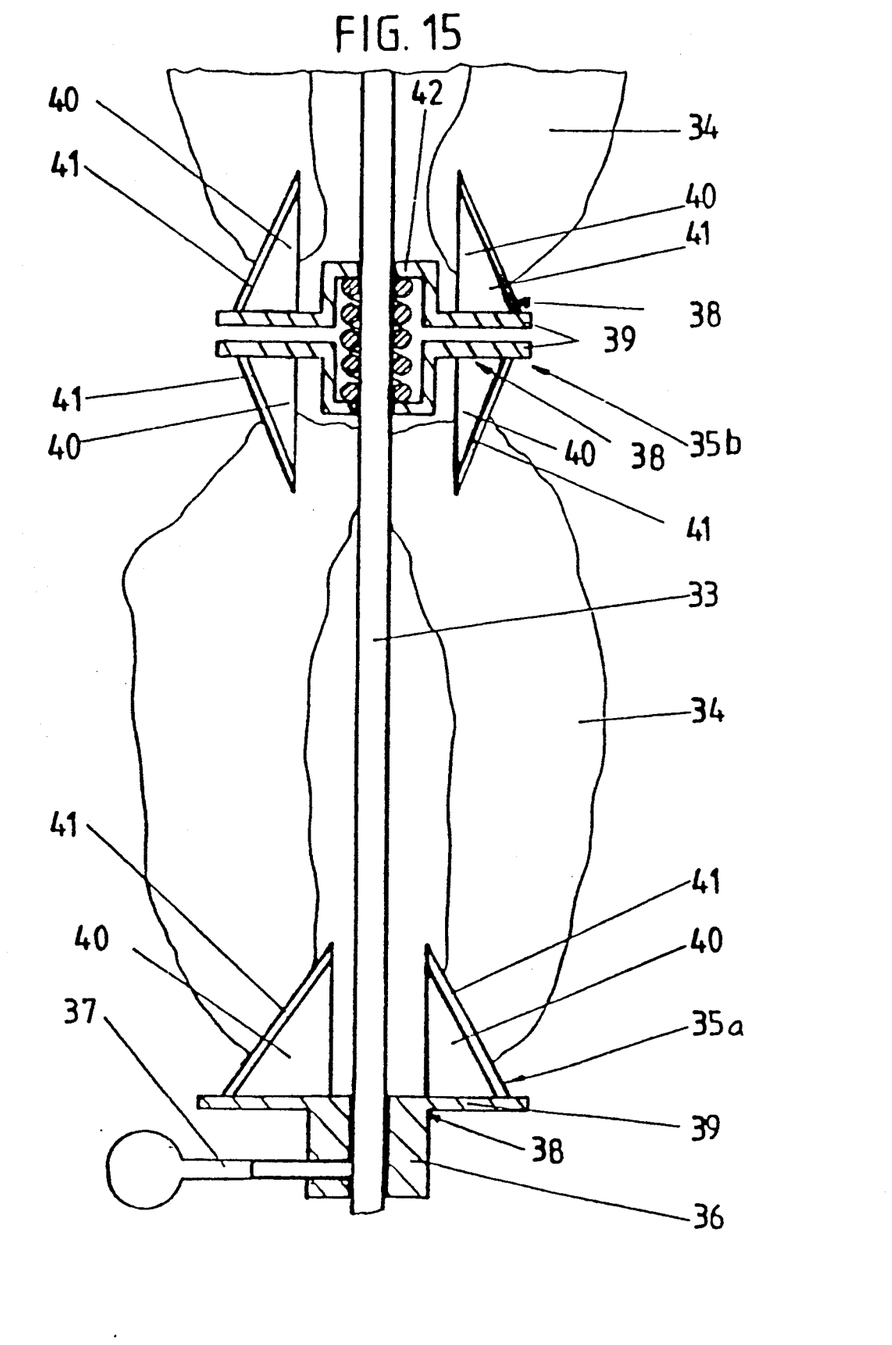
FIG. 15 shows a section of a grill spit with cut, illustrated grill food pieces and clamp elements.

FIG. 15 shows a portion of a grill spit 33 on which pieces of grill food 34 are spitted. Each piece of grill food 34 is clamped on the spit between two clamp elements 35a, b, which are pushed onto the grill spit 33. The clamp element 35a has a slider 36, which is attached to the grill spit 33 with a set screw 37. Facing the grill food 34 is a grasping element 38 with a plate 39 and prongs 40 projecting from the plate 39 The prongs 40 have ground cutting edges 41 adapted to cut into the grill food 34.

The other clamp element 35b has two grasping elements 38 with plates 39 supporting extending in opposite directions and sticking into different grill food 34.

Between the plates 39 of the grasping elements 38 of the clamp element 35b is placed a helical spring 42, which is compressed and thus acts in the longitudinal direction of the grill spit 33 with its spring tension on the plates 39 of the grasping elements 38.

Figure 16:
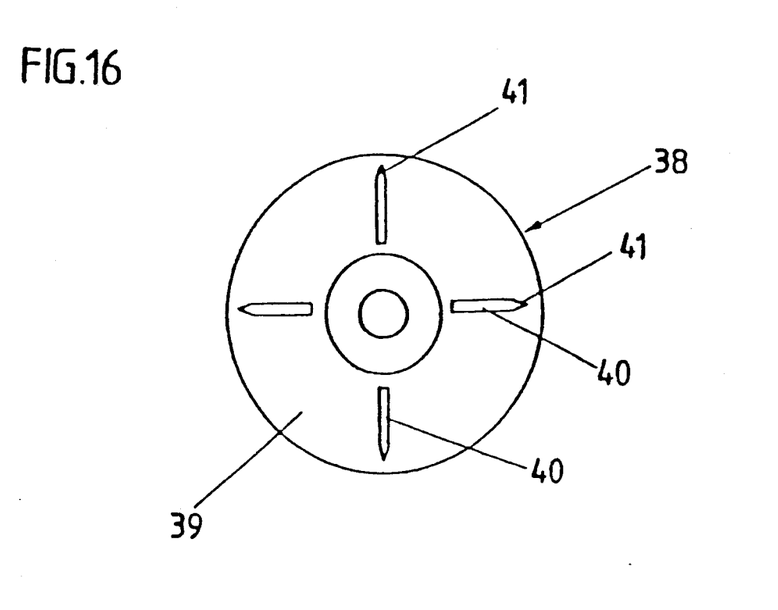
FIG. 16 is a view of a clamp element of FIG. 1 in the direction of the arms of the clamp element.

FIG. 16 shows a plate 39 of a grasping element 38, the prongs 40 being shown in a sectional view and the profile of the cutting edges 41 being apparent.

Figure 17:
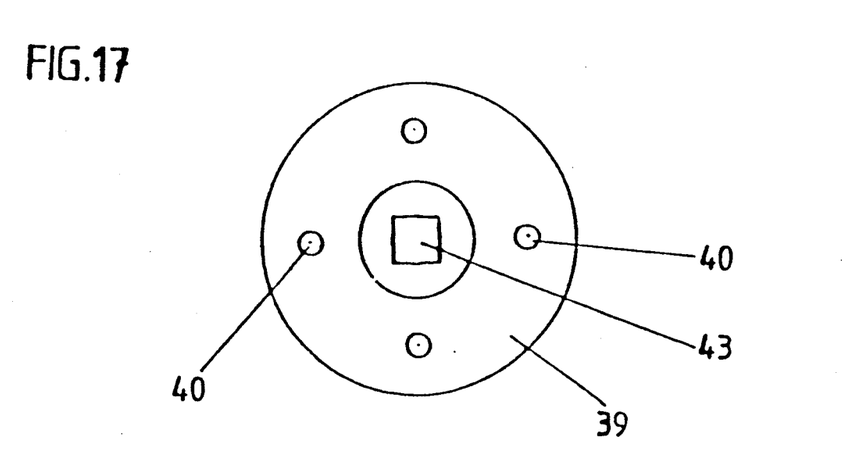
FIG. 17 is a view similar to that of FIG. 2 of a second embodiment of a clamp element.

FIG. 17 shows a plate 39 with spike-like prongs 40. In the center of the plate 39 is a square opening 43 through which a grill spit 33 with a square cross-section can extend so that the plate 39 is rotationally stable on the grill spit 33.

Figure 18:
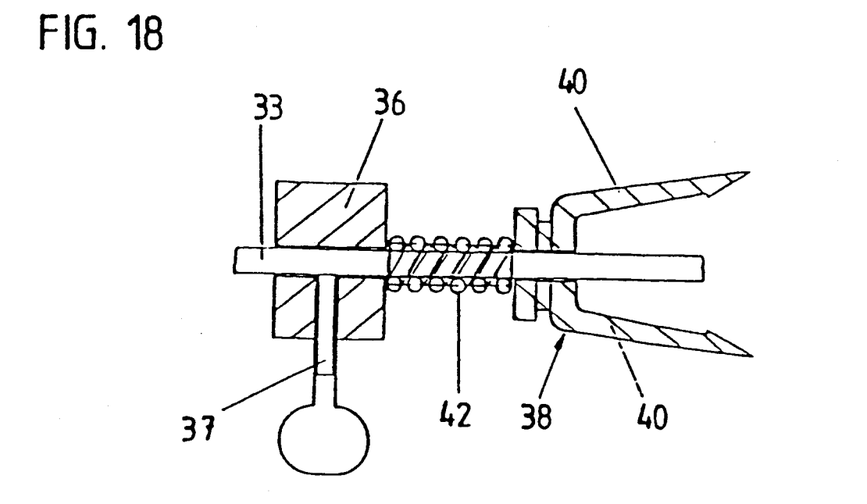
FIG. 18 is a sectional view of a third embodiment of a clamp element arranged on a grill spit.

FIG. 18 shows another embodiment of a clamp element with a grasping element 38 with prongs 40, which is braced at a slider 36, attached to the grill spit 33 with a set screw 37, by means of a helical spring 42.

Figure 19:
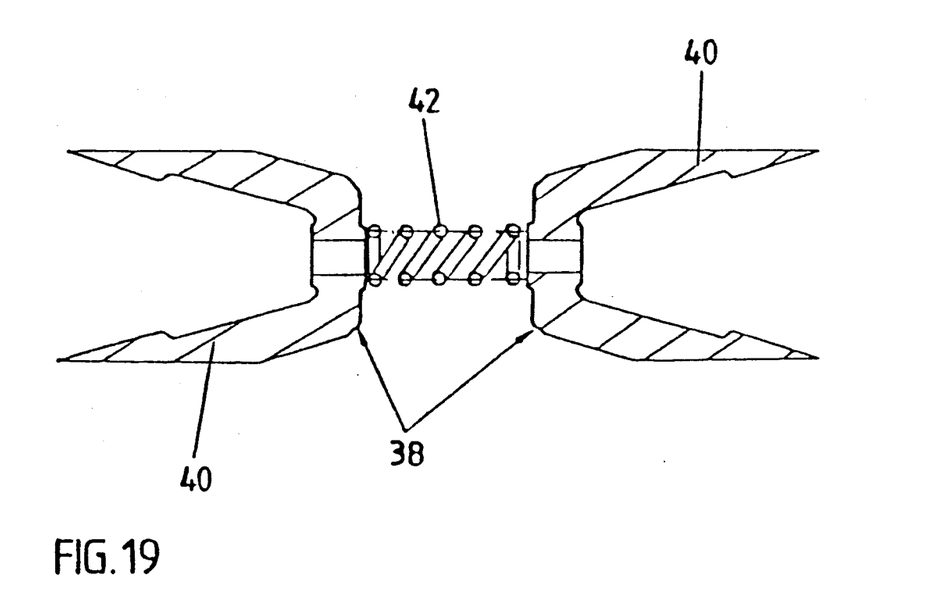
FIG. 19 is a side view of a fourth embodiment of a clamp element.

FIG. 19 shows another embodiment of a clamp element with two grasping elements 38 with prongs 40, which are connected to one another by means of a helical spring 42.

Figure 20:
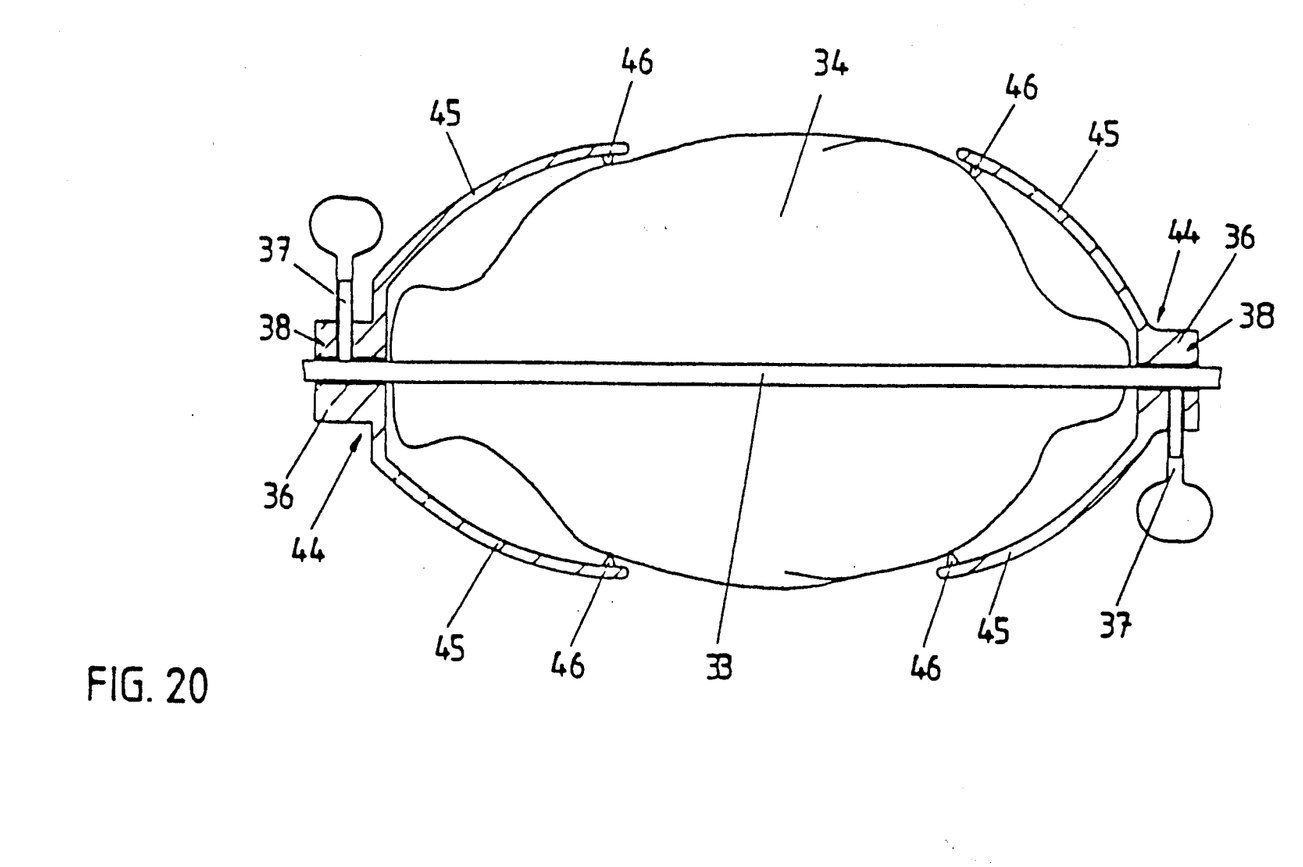
FIG. 20 shows a section of a grill spit with grill food pieces and a fifth embodiment of clamp elements illustrated as a fragment.

FIG. 20 shows clamp elements 44, having flexible arms 45, which are arranged at sliders 36 and which bear to the outside of the grill food 34. The arms 45 have nubs 46 bearing against the food, although the nubs can be designed as spikes that can penetrate into the grill food 34.

Figure 21:
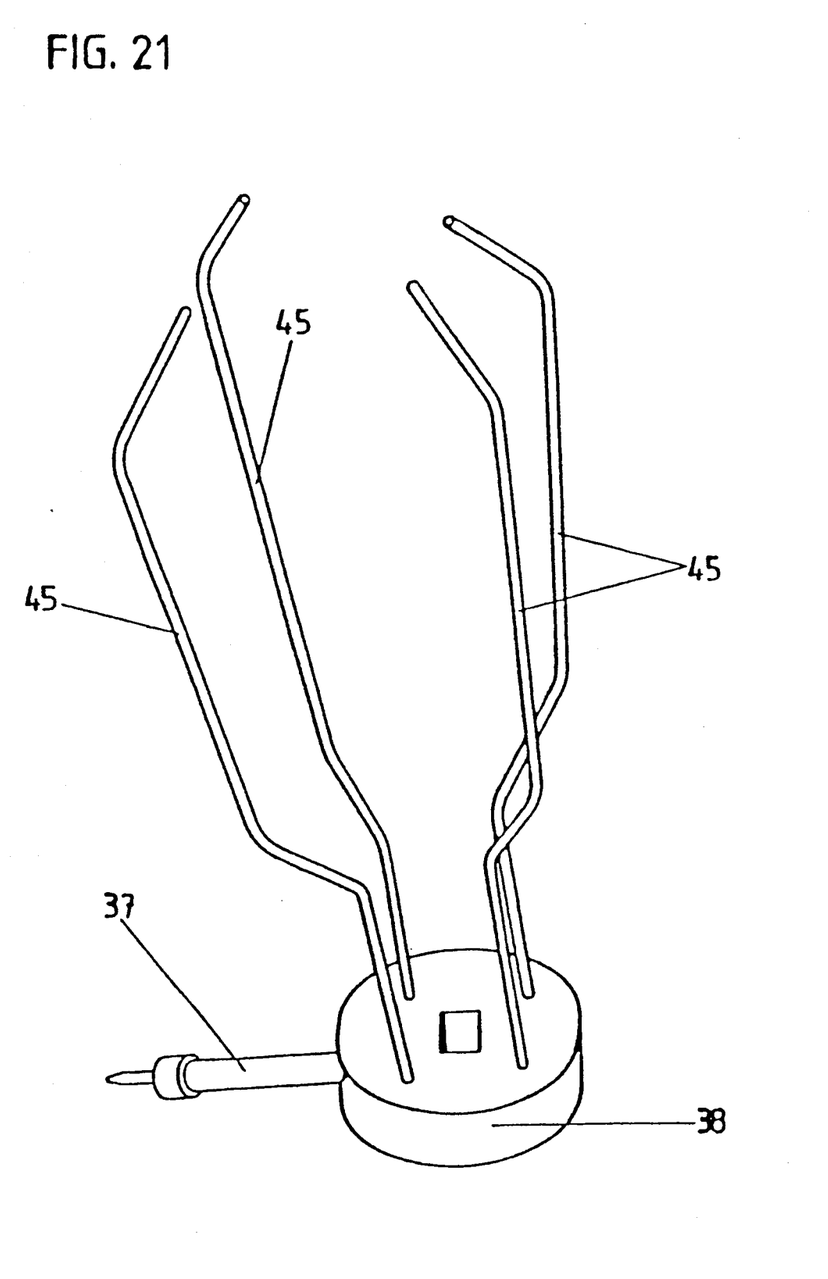
FIG. 21 is a view of an another embodiment of a clamp element with springy spreaders, reaching into a cavity of the grill food.

FIG. 21 is a view of an embodiment of the clamp element in which four arms 45 made of flexible round steel are arranged at the grasping element 38, which can be fastened on a grill spit with a set screw 37. The arms 45 are designed in such a manner that they can reach into a cavity in the grill food (cf. also FIG. 25) and also act as spreaders spreading the cavity from the inside.

Figure 22:
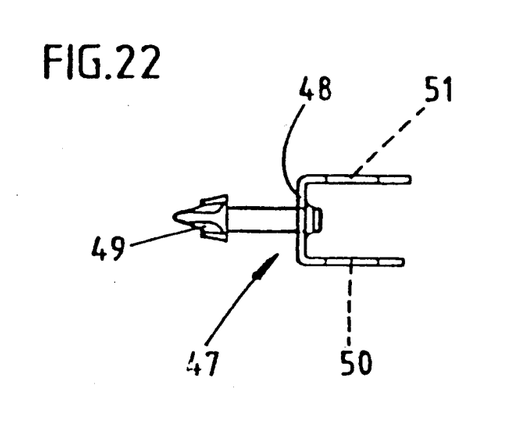
FIG. 22 is a front view of a stop element.
Figure 23:
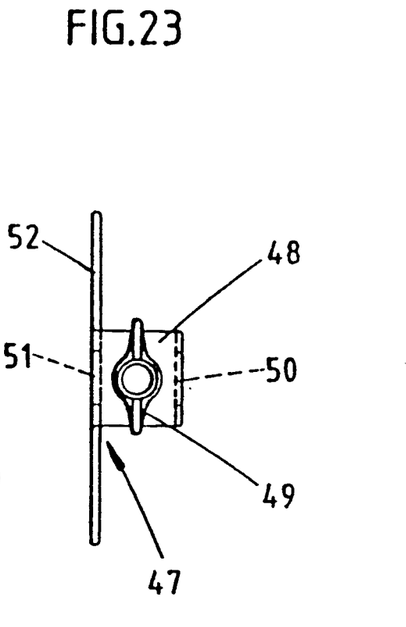
Figure 24:
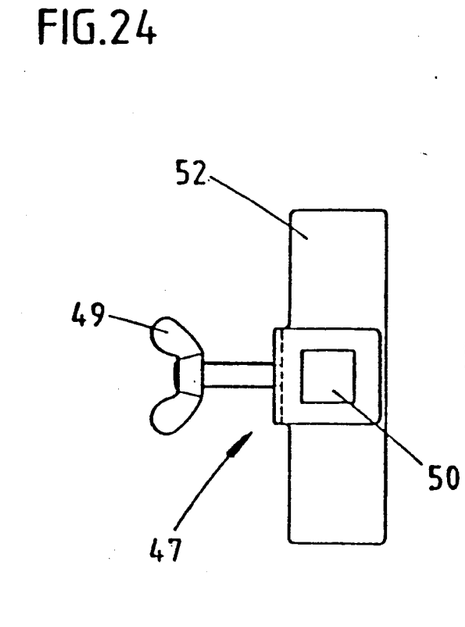
FIG. 24 is a front view of the object of FIG. 22.

The stop element 47, shown in FIGS. 22 to 24, has a fastening part 48 with a fastening screw 49. The fastening part 48 has a passage bore 5, through which a grill spit can be extended. An aligned passage bore 51 is provided in the stop part 52. The stop part 52 has a length of several times, for example, five to fifteen times the diameter of the passage bore 51.

Figure 25:
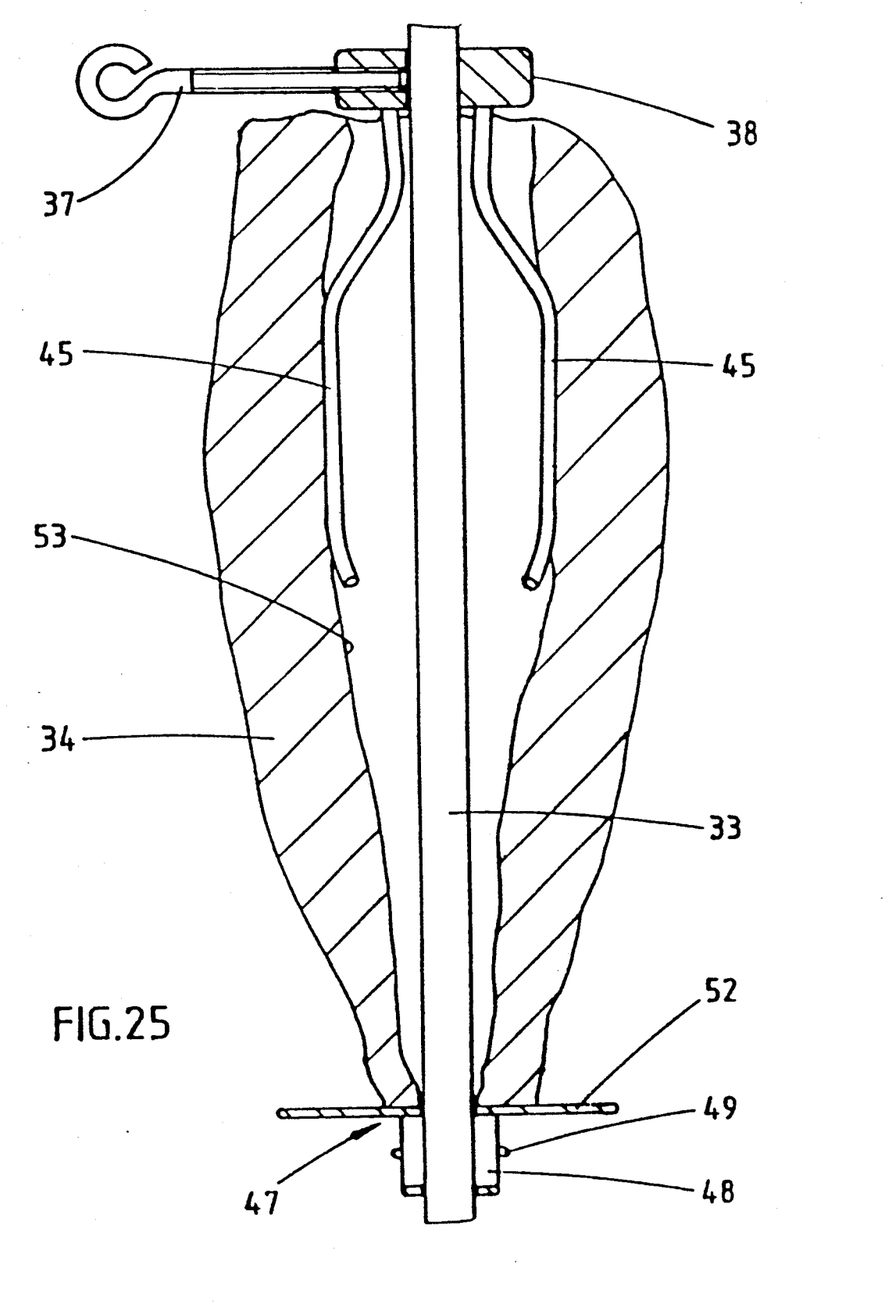
FIG. 25 is a fragmentary sectional view of a section of a grill spit with introduced spreadable clamp element and a stop element.

Finally, FIG. 25 shows a grill spit 33 with grill food 34 supported thereon and a spreading element (FIG. 21) extending into the grill food 34. The arms 45 extend into the inner cavity 53 of the food. During the cooking process and related thawing of a firm grill food 34, the arms 45 can maintain the hold of the meat by means of a spreader. The stop element 47, which is used in the embodiment of FIG. 25, provides for a secure stop hold. As an end piece, this stop element 47 is, however, especially important in relationship to the use of the clamp element, according to FIGS. 15 to 19.

We claim:

1. A support element for supporting fowl during storage and for use during cooking, said fowl having a through cavity, the element having an overall conical shape and being insertable in the through cavity of the fowl, and the element having a first generally cylindrical section, a second conical tapered section, and a third generally cylindrical section, said first section having a larger diameter compared to the diameter of said third section, said first section merging into said second section which defines a shoulder on which the fowl can rest by virtue of its bone structure.

2. The element according to claim 1, wherein an end of said first section is open and defines a base of said element, said element comprising a pair of intersecting elongated members of different lengths presenting an opening at a top end of said element opposite said base, said opening defining an air passage.

3. The element according to claim 1 wherein a radially extending elastic means is provided adjacent a tip end of said element located on said third section, said means anchoring the element upon insertion into the fowl cavity, and said means being bendable to permit easy removal of the element from the cavity.

4. The element according to claim 3, wherein said means comprise a plurality of spaced lugs.

5. The element according to claim 3, wherein radially extending projections are provided on said element at a base of said first section, said projections forming grasping means for the withdrawal of the element from the cavity.

6. The element according to claim 1, wherein said element comprises a hollow tube having a closed tip end, said tip end comprising an end portion of said third generally cylindrical section.

* * * * *